US012257198B1

(12) United States Patent
Escobar

(10) Patent No.: US 12,257,198 B1
(45) Date of Patent: Mar. 25, 2025

(54) AMBULATORY AID DEVICE

(71) Applicant: Richard Joseph Escobar, Newman, CA (US)

(72) Inventor: Richard Joseph Escobar, Newman, CA (US)

( * ) Notice: Subject to any disclaimer, the term of this patent is extended or adjusted under 35 U.S.C. 154(b) by 581 days.

(21) Appl. No.: 17/521,716

(22) Filed: Nov. 8, 2021

Related U.S. Application Data

(60) Provisional application No. 63/125,889, filed on Dec. 15, 2020.

(51) Int. Cl.
*A61G 5/14* (2006.01)
*A61H 3/00* (2006.01)

(52) U.S. Cl.
CPC ............... *A61G 5/14* (2013.01); *A61H 3/008* (2013.01); *A61H 2201/0119* (2013.01); *A61H 2201/0192* (2013.01); *A61H 2201/1604* (2013.01); *A61H 2201/1619* (2013.01); *A61H 2201/1633* (2013.01)

(58) Field of Classification Search
CPC ............ A61H 3/008; A61H 2201/0119; A61H 2201/0192; A61H 2201/1604; A61H 2201/1619; A61H 2201/1633; A61G 5/14; A63B 21/00; A63B 21/00181; A63B 21/4009; A63B 23/04; A63B 2208/029; A63B 69/00; A63B 69/0057; A63B 69/0059; A63B 69/0064; A63B 69/3608; A63G 1/00; A63H 13/20; F16M 2200/063
USPC .................... 601/27; 472/1, 7, 9, 14–15, 29; 248/281.11, 585, 280.11, 123.11, 575, 248/586
See application file for complete search history.

(56) References Cited

U.S. PATENT DOCUMENTS

| | | | | | | |
|---|---|---|---|---|---|---|
| 124,706 | A | * | 3/1872 | Westlake | A47D 13/043 | 482/66 |
| 341,167 | A | * | 5/1886 | Pudder | A47D 13/043 | 482/66 |
| 1,297,800 | A | * | 3/1919 | Cranford | A47D 13/043 | 297/274 |
| 1,384,215 | A | * | 7/1921 | Scott | A61H 3/008 | 482/66 |
| 1,469,436 | A | * | 10/1923 | Fornia | A47D 13/043 | D21/419 |
| 3,829,916 | A | * | 8/1974 | James | A61G 7/1046 | 5/83.1 |
| 4,187,869 | A | * | 2/1980 | Marchetti | A61H 3/04 | 135/67 |
| 4,188,966 | A | * | 2/1980 | Palmer | A61H 3/04 | 482/67 |
| 5,409,246 | A | * | 4/1995 | Ali | A47D 13/043 | 472/15 |
| 5,470,294 | A | * | 11/1995 | Ingram | A47D 13/04 | 482/89 |
| 5,842,672 | A | * | 12/1998 | Sweere | F16M 11/24 | 248/278.1 |

(Continued)

*Primary Examiner* — Justine R Yu
*Assistant Examiner* — Alexander Morales
(74) *Attorney, Agent, or Firm* — Plager Schack LLP; Mark H. Plager, Esq.; Naomi Mann, Esq.

(57) ABSTRACT

An ambulatory aid device includes a fixed position support, and a movable user support structure coupled to the fixed position support. The user support structure includes at least one of a headrest, a trunk support, a pelvic support, and/or seat, which may be height adjustable, position adjustable, size adjustable, and/or interchangeable.

12 Claims, 4 Drawing Sheets

(56) References Cited

U.S. PATENT DOCUMENTS

| | | | | |
|---|---|---|---|---|
| 6,832,770 | B1 | 12/2004 | Wright-Ott et al. | |
| 7,544,172 | B2 | 6/2009 | Santos-Munne et al. | |
| 8,137,243 | B2 * | 3/2012 | Coote | A63B 9/00 482/33 |
| 8,342,467 | B2 * | 1/2013 | Stachowski | F16M 13/02 248/281.11 |
| 8,864,092 | B2 * | 10/2014 | Newville | F16M 13/02 361/679.01 |
| 9,427,374 | B2 | 8/2016 | Hoebel | |
| 9,498,696 | B1 * | 11/2016 | Razon | A63B 22/0046 |
| 9,625,091 | B1 * | 4/2017 | Massey | F16M 11/04 |
| 11,131,423 | B2 * | 9/2021 | Anderson | F16M 11/10 |
| 2004/0084587 | A1 * | 5/2004 | Oddsen | F16M 11/10 248/284.1 |
| 2016/0001118 | A1 * | 1/2016 | Kuehne | A63B 23/04 482/54 |
| 2016/0184164 | A1 * | 6/2016 | Browning | A63B 21/015 482/115 |
| 2019/0240105 | A1 * | 8/2019 | Jung | A61H 3/00 |
| 2021/0121343 | A1 | 4/2021 | Lonner et al. | |

* cited by examiner

FIG. 4
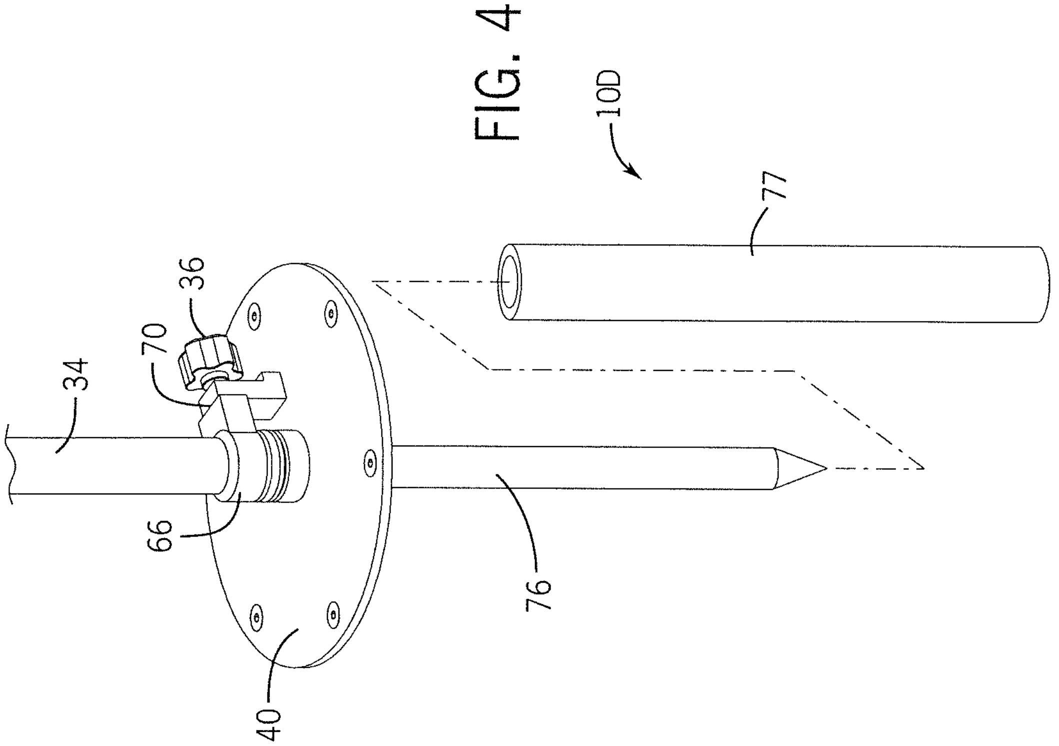
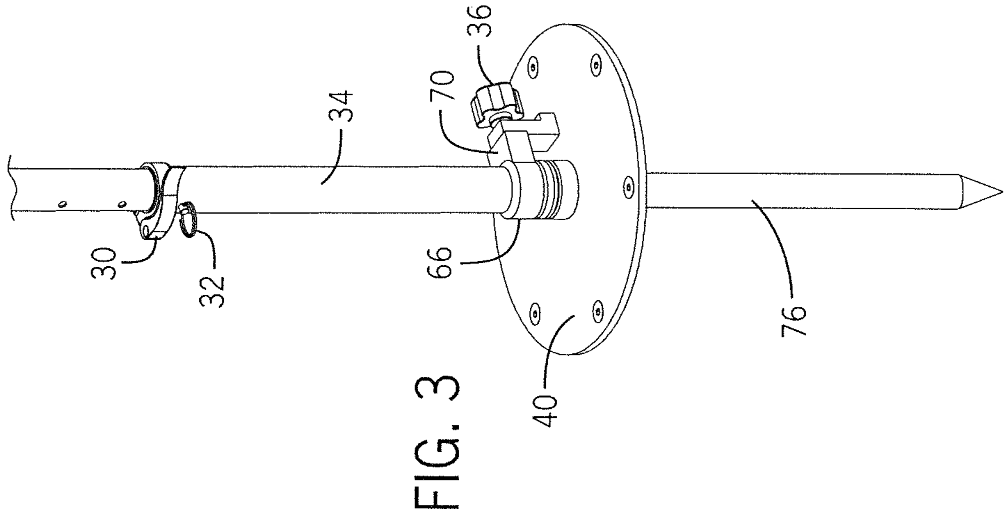
FIG. 3

AMBULATORY AID DEVICE

RELATED APPLICATION

This application claims benefit to U.S. Provisional Application No. 63/125,889 filed Dec. 15, 2020, which is incorporated by reference herein in its entirety.

BACKGROUND

The embodiments herein relate generally to devices and methods for assisting individuals with undeveloped or impaired ability to walk and/or stand.

Individuals, including toddlers learning how to walk, or individuals with a physical disability or injury may require assistance in development, training and/or exercise of muscles. In some instances, lack of ambulatory motion or prolonged sitting may result in muscular atrophy, and/or flexion contracture in hips and knees of some patients which may cause pain and inhibit the ability to stand fully upright. As such, an improved system to aid such individuals is desirable.

SUMMARY

According to certain embodiments, disclosed is an ambulatory aid device and method. In certain embodiments, the ambulatory aid device may comprise a fixed support structure and a movable user support structure coupled to the fixed support structure. According to further embodiments, the ambulatory aid device may comprise a user support structure; an axial structure; and a radial arm structure coupling the user support structure to the axial structure, wherein the user support structure is configured to provide gravitational support to a user while walking or standing, and wherein the user support structure is movable in a generally circular and/or repetitive path about the axial structure. In embodiments, the user support structure may include user support elements, such as a headrest, a trunk support, a pelvic support, and/or seat. In some embodiments, the user support elements may be height adjustable, position adjustable, size adjustable, and/or interchangeable. In certain embodiments, the user support structure may be configured to rotate about an axial structure which may be supported by the fixed support structure.

Various benefits and/or advantages of the disclosed system may include enabling a user to ambulate with self-initiated mobility. Further benefits and/or advantages may include enabling a user to ambulate without the active assistance of the caregiver, and without the floor being the moving component (such as in a treadmill). Some other benefits and/or advantages may include allowing the user to be safe as well as the caregiver or therapist. Yet further benefits and/or advantages may include enabling a parent, therapist, teacher, or other caregiver the ability to aid an individual with a physical disability, diminished and/or undeveloped ambulatory capability to enhance their life in a multifaceted way. Further benefits and/or advantages may include enabling a user to be upright and be able to move independently, improve muscle strength, improve endurance, improve bone mineral density, improve blood circulation, improve breathing, improve bowel and urinary function, improve sleep and fatigue issues, and/or improve social interaction to peers. Other benefits and/or advantages may include providing a device which is fixed in position, to provide control over the range of movement or direction of the individual, thus increasing safety.

BRIEF DESCRIPTION OF THE FIGURES

The detailed description of some embodiments of the invention is made below with reference to the accompanying figures, wherein like numerals represent corresponding parts of the figures.

FIG. 3 depicts an alternate embodiment of the ambulatory aid device shown in FIG. 1.

FIG. 4 includes further details of the ambulatory aid device of FIG. 3.

DETAILED DESCRIPTION OF CERTAIN EMBODIMENTS

Figure 1:
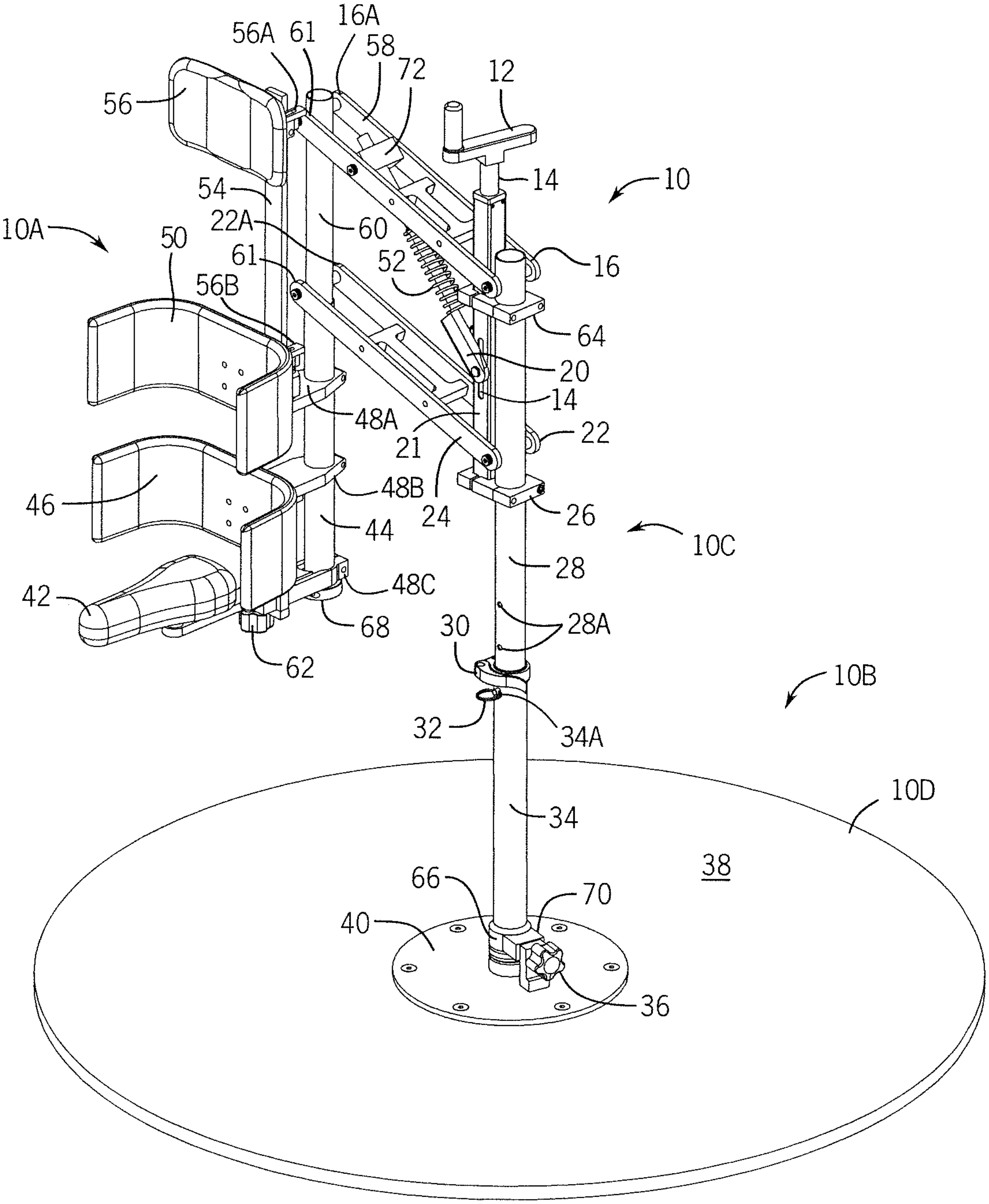
FIG. 1 depicts an ambulatory aid device, in accordance with a first embodiment.

In the following detailed description of the invention, numerous details, examples, and embodiments of the invention are described. However, it will be clear and apparent to one skilled in the art that the invention is not limited to the embodiments set forth and that the invention can be adapted for any of several applications.

According to various embodiments, as depicted in FIGS. 1-5, disclosed is an ambulatory aid device 10 which may generally comprise a user support structure 10A that is movable with respect to a fixed support structure 10B. In embodiments, user support structure 10A is movable in a circular and/or repetitive path, while held by the fixed support structure. As such, ambulatory aid device 10 enables a user to ambulate in a continuous and/or circular path, while supported within user support structure 10A.

In some embodiments, user support structure 10A may be height and/or position adjustable to accommodate the needs of the user. In certain embodiments, user support structure 10A may be configured to move in a circular path and/or continuous path about an axial structure 10C, which is held by the fixed support structure 10B. In some embodiments, axial structure 10C may be configured to rotate with respect to fixed support structure 10B. In certain embodiments, user support structure 10A may be coupled to the axial structure 10C via a radial arm structure, which is held above ground level by the axial structure and extends radially outwards from the axial structure.

In embodiments, axial structure 10C may comprise a lower main beam 34, which may be coupled to fixed support structure 10B at the main beam's lower end and in a vertical orientation. In embodiments, lower main beam 34 may be configured to continuously rotate 360 degrees, with respect to fixed support structure 10B. In one embodiment, lower main beam 34 may be rotationally supported on a beam support plate 40, and may rotate on a bearing within plate 40. In some embodiments, lower main beam 34 may include a tension sleeve 66, which is attached around lower main beam 34 and configured to apply resistance to the rotational motion of the beam. In one embodiment, a tension pad 70 may apply pressure against tension sleeve, which may be modulated via an adjustment knob 36 to enable adjustment of the pressure/resistance of the tension sleeve. In certain embodiments, lower main beam 34, tension sleeve 66, along with tension pad 70 and knob 36 may be supported on a beam support plate 40.

In embodiments, an upper adjustment beam 28 may be coupled to the lower main beam 34 and is configured to rotate together with the lower main beam. In embodiments, the lower main beam 34 may comprise a hollow into which the upper adjustment beam 28 may slide. As such, the upper adjustment beam may be extended or retracted from the lower main beam, rendering the axial structure 10C height adjustable. In certain embodiments, holes 28A may be provided within upper adjustment beam 28, wherein a lock pin 32 may be inserted into one of the holes 28A, and into a corresponding hole 34A in the lower main beam, to fix the position of the upper adjustment beam 28 with respect to the lower main beam 34. Additionally, a locking clamp 30 may securely lock the upper adjustment beam 28 to the lower main beam 34. It shall be appreciated that different height adjustment mechanisms for axial structure 10C may be used in alternate embodiments. Additionally, other height and/or position adjustment elements may be used in user support structure 10A, and/or elements which couple the user support structure to axial structure 10C, as will be described.

In embodiments, user support structure 10A is distally coupled to axial structure 10C via a radial arm structure. In some embodiment, the radial arm structure may comprise a lower swing arm 24 and an upper swing arm 58, which couple user support structure 10A to axial structure 10C. In certain embodiments, lower swing arm 24 and upper swing arm 58 may jointly hold a support beam 60 of the user support structure 10A at their distal ends 61. In some embodiments, arms 24 and 58 may be parallel to one another, and together hold support beam 60 in parallel alignment to beams 28 and 34. In one embodiment, lower swing arm 24 may be pivotally coupled to upper adjustment beam 28 via a first lower pivot joint 22, and to support beam 60 at a second lower pivot joint 22A; and upper swing arm 58 may be pivotally coupled to upper adjustment beam 28 at a first upper pivot joint 16, and to support beam 60 at a second upper pivot joint 16A, wherein the distance between first pivot joints 22 and 16 is equal to the distance between second pivot joints 22A and 16A.

In certain embodiments, a spring adjustment arm 20 comprising spring element 52, may work in conjunction with upper swing arm 58 to control positioning and permit tunable adjustment of the height level of support beam 60. In embodiments, spring adjustment arm 20 may further enable a gentle bobbing motion of the support beam 60 for a natural gait. In one embodiment, spring adjustment arm 20 may be coupled at a first end to an adjustment shaft 14 within an adjustment shaft tube 21 proximate upper adjustment beam 28; and at a second end to a spring pivot block 72 within upper swing arm 58. In certain embodiments, spring pivot block 72 may be positioned between a midpoint and the distal end of upper swing arm 58. A height adjustment handle 12 coupled to adjustment shaft 14 outside adjustment shaft tube 21, may be configured to enable up and down movement of adjustment shaft 14 within adjustment shaft tube 21. Adjustment shaft tube 21 may be supported via a lower support block 26 and an upper support block 64, both of which may be coupled to beam 28.

Thus, lower swing arm 24 and upper swing arm 58 are configured to pivot in parallel, as the spring adjustment arm 20 works in conjunction with the upper swing arm 58 and the adjustment shaft 14 to set the height of the user support structure, and to provide the device with dynamic motion for a natural gait. Additionally, height adjustment handle 12 allows an operator (e.g., caregiver) to raise or lower the user to an optimum height and/or control weight bearing. In some embodiments, the device may be adjusted by the operator as a user/patient is walking and/or supported within the device. The disclosed configuration enables the user to walk in a circular path while supported by user support structure, as axial structure 10C rotates with respect to fixed support structure 10B. It shall be appreciated that in alternate embodiments, the radial arm structure may itself be configured to rotate, instead of axial structure 10C.

Figure 2:
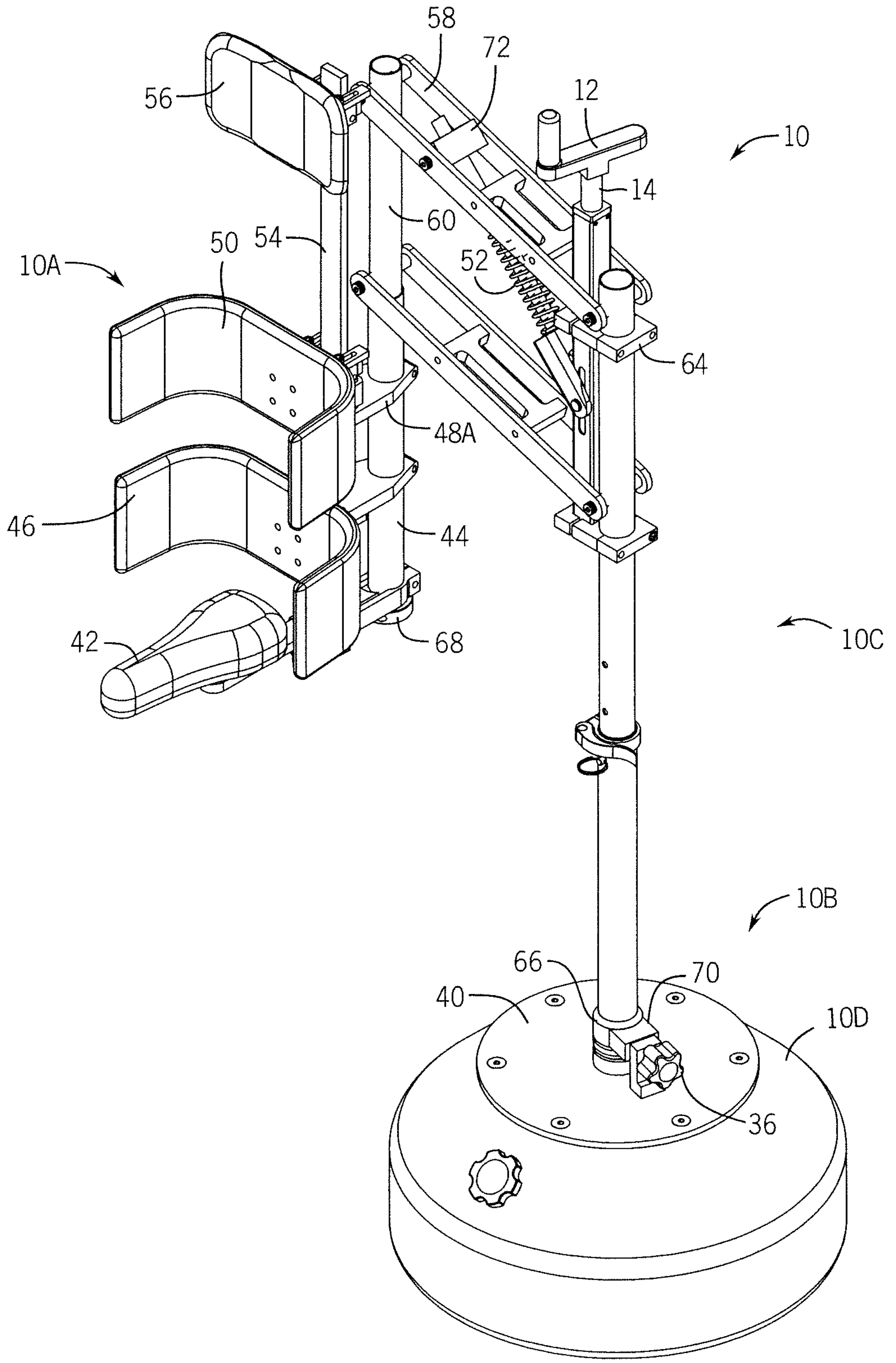
FIG. 2 depicts an alternate embodiment of the ambulatory aid device shown in FIG. 1.

In embodiments, user support structure 10A may generally comprise various user support elements, including a headrest 56, a trunk support 50, a pelvic support 46, and/or a seat 42. In certain embodiments, headrest 56, trunk support 50, pelvic support 46, and/or seat 42 may be height and/or position adjustable. In one embodiment as depicted in FIGS. 1 and 2, trunk support 50, may be coupled to support beam 60 via trunk support bracket 48A, while pelvic support 46, and seat 42 may be coupled to a three-position support beam 44 via pelvic support bracket 48B, and seat bracket 48C, respectively. In embodiments, three-position support beam 44 is configured to rotate 180 degrees with respect to support beam 60, and may be adjusted and locket into position via pelvic support bracket 48B. This allows the pelvic support 46 and seat 46 to be locked at right or left twisted positions with respect to trunk support 50, as well as in straight alinement with trunk support 50. In embodiments, brackets 48A, B, and C, may be height and/or position adjustable with respect to support beam 60. In some embodiments, brackets 48A, B, and/or C may be removable from support beam 60 enabling any one of the user support elements to be detached from the device. In some embodiments, a lower cap 68 may be provided on a bottom end of support beam 60. Lower cap 68 may support of seat bracket 48C, and/or be removable for enabling any one of brackets 48 A, B, or C to be slid off support beam 60. In some embodiments, seat bracket 48C may be configured to enable seat 42 to slide forwards and backwards via a seat adjustment knob 62. In some embodiments, seat 42 may further be configured to swivel with respect to seat bracket 48C. In certain embodiments, a vertical trunk support arm 54 may couple headrest 56 to trunk support 50 via a top trunk bracket 56A and a bottom trunk bracket 56B. In some embodiments, top trunk bracket 56A may be configured to permit height and/or position adjustment of headrest 56 with respect to trunk support arm 54. In some further embodiments, bottom trunk bracket 56B may be configured to permit height and/or position adjustment of trunk support arm 54 with respect to trunk support 50.

Thus, headrest 56, trunk support 50, pelvic support 46, and/or seat 42 may be adjustable to multiple positions, enabling for optimal positioning and/or adjustment depending upon factors such as size, core strength, balance, etc. of the user. It shall be appreciated that headrest 56, trunk support 50, pelvic support 46, and seat 42 may have different sizes, contours, and/or geometric configurations, and may further be interchangeable in alternate embodiments. It shall be appreciated that any one of the user support elements may be omitted and/or removable from ambulatory aid device 10 in alternate embodiments. The disclosed device may incorporate other user support elements, and/or muscle strengthening/training elements in alternate embodiments. Such elements may include for example, an element for support of the user's arms, elastic bands for muscle strengthening, etc. In one embodiment, ambulatory aid device 10 may include an elastic strap with soft padding, which may attach to the front of the user's thigh and above the knee to help stretch the knees and hips out of flexion.

According to various embodiments, fixed support structure 10B may anchor ambulatory aid device 10 to a floor or other surface. Fixed support 10B may further be configured to retain axial structure 10C in a manner which enables it to rotate with respect to fixed support 10B. In certain embodiments, as best depicted in FIGS. 1 and 2, fixed support structure 10B may comprise a stationary base 10D, which may be weighted or otherwise fixed to a ground surface. In one embodiment, the stationary base may comprise a flat plate 38 made of a heavy material such as metal or concrete. Flat plate 38 may be, for example, a disc as shown in FIG. 1. In another embodiment as shown in FIG. 2, stationary base 10D may comprise a fillable structure 74, which may be weighed down by filling with water, sand, or other flowable substance. As such, device 10 may be easily transported and/or placed a desired location, wherein fillable structure 74 may be filled to weigh down the device after transport.

In certain embodiments, axial structure 10C comprising lower main beam 34 may be attached to the stationary base 10D via a beam support plate 40, as shown in FIGS. 1 and 2. In one embodiment, beam support plate 40 may be configured to bolt onto stationary base 10D.

In yet another embodiment, as best depicted in FIGS. 3 and 4, fixed support structure 10B may comprise a lower support element 76 which may be received within a pipe 77 to hold device 10 above ground level. In one embodiment, lower support element 76 may be a spiked beam extending below support plate 40, and configured to easily insert and affix within pipe 77. Pipe 77 may be made of a material such as concrete or metal, and may be cemented, bolted, or otherwise attached to a ground surface.

It shall be appreciated that different components and/or structural arrangements of support structure 10B/stationary base 10D may be employed in alternate embodiments. For example, fixed support structure 10B/stationary base 10D may comprise a foldable and/or a wheelable base structure for easy transport and/or storage. In some embodiments, ambulatory aid device may include a corner or wall attachment bracket, configured to anchor the device to a wall or corner of a building structure.

Figure 5:
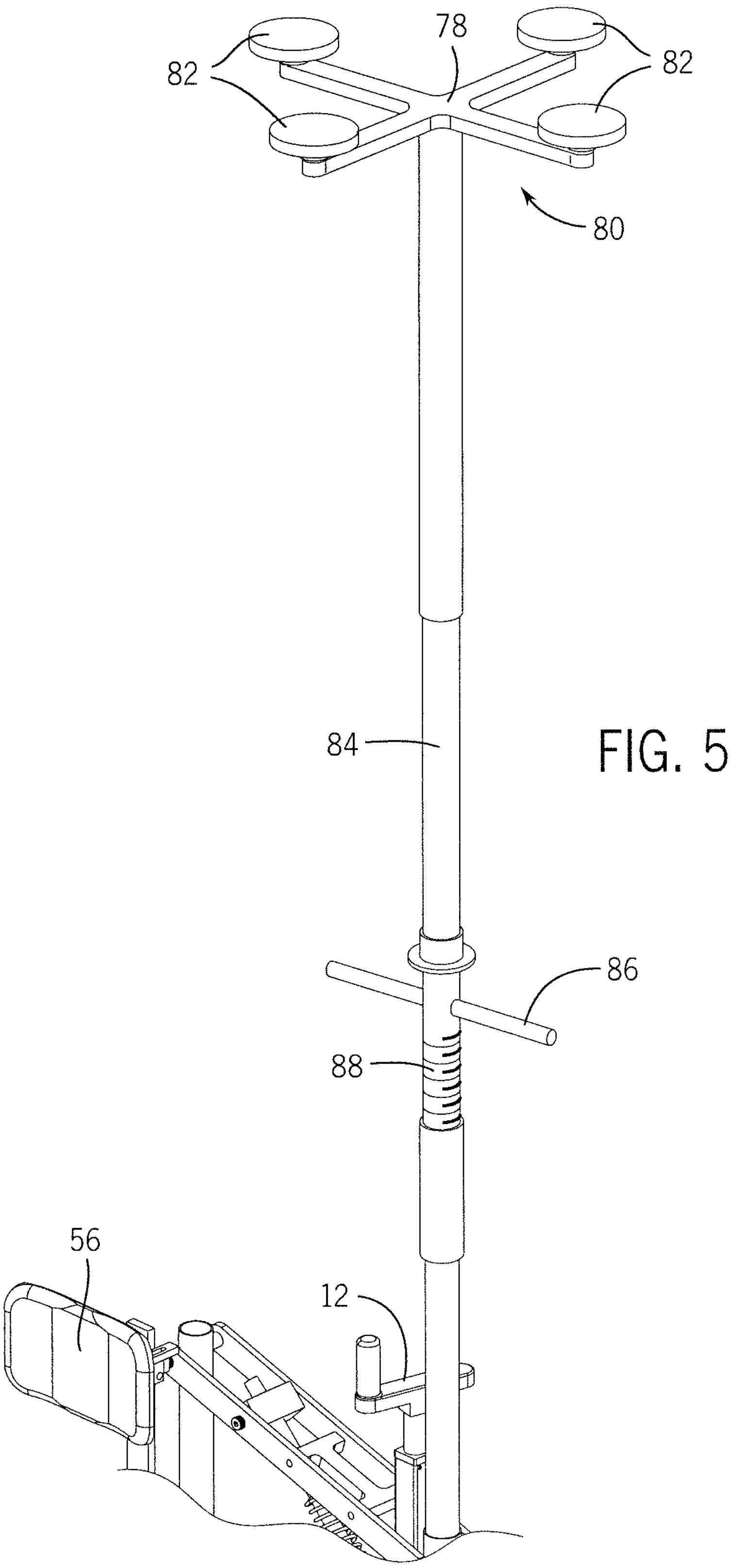
FIG. 5 depicts a celling support structure for the ambulatory aid device, according to various embodiments.

In some embodiments, as best depicted in FIG. 5, fixed support 10B may include a ceiling bracket 80, which enables device 10 to be supported between the ceiling and floor, wherein axial structure is bracketed between ceiling bracket 80 and stationary base 10D. In some embodiments, ceiling bracket 80 may be coupled to a height adjustable support 84, which enables a user to raise or lower ceiling bracket 80 for applying appropriate tension between the floor and ceiling to wedge the device in place. In one embodiment, ceiling bracket 80 may comprise a ceiling base 78 supporting at least one surface contact element(s) 82, the surface contact element being configured to contact the ceiling for securing the device in place. In embodiments, surface contact element (s) 82 may comprise a padded or cushioned material to protect the ceiling from damage. In one embodiment, ceiling bracket 80 may comprise four surface contact elements 82, as shown in FIG. 5. In certain embodiments, height adjustable support 84 may comprise an adjustable telescoping beam. In some embodiments, height adjustable support 84 may be supported on a threaded extension adjustment 88 which may be movable via a ratcheting height adjustment handle 86 to further enable height adjustment of ceiling bracket 80. It shall be appreciated that different mechanisms for adjustment of the ceiling bracket 80 may be employed in alternate embodiments.

It shall be appreciated that the ambulatory aid device disclosed herein may include adjustable components, interchangeable components, and/or components of varied size and strength making it suitable for a wide variety of users. In embodiments, the disclosed device may be made suitable for use by toddlers and adults alike, with the ability to support various weights and/or weight ranges. In some embodiments, the device may be suitable for users who are 20 pounds and greater. According to various embodiments, the circular path provided by the device may encompass a radius of at least about 1 foot.

It shall be appreciated that the ambulatory aid device disclosed in several embodiments herein may also be specifically manufactured to suit individuals according to their particular needs (e.g., disabilities and/or developmental needs). Thus, in one embodiment, the device may be tailored to assist adults with disabilities in standing and walking. In another embodiment, the device may be designed for use by children as young as nine months old who have a physical disability which may impair their ability to stand in an upright position and/or walk. Such disability may cause delays in cognition, visual and vocal capabilities if not treated. In another embodiment, the device may be designed to assist toddlers in going through normal development, e.g., standing and walking, to enhance all of the above-mentioned functional characteristics. Thus, the disclosed device may be used as a stationary dynamic mobility gait trainer and stander in a variety of places from preschool to adult care facilities, hospitals, physical training facilities, a workplace, and the like.

The disclosed device and method functions to assist disabled and/or underdeveloped individuals to ambulate safely, and provides an interactive means of training, exercising and/or improving gait. Additionally, the disclosed device limits mobility to a fixed area so that a parent, therapist, and/or caregiver does not need to follow and/or continually guide the individual user (e.g., patient, toddler, etc.) to ensure safety. As such, the device may be used as a convenient walker for toddlers.

It shall be appreciated that the components of ambulatory aid devise described in several embodiments herein may comprise any alternative known materials in the field and be of any color, size and/or dimensions. It shall be appreciated that the components of ambulatory aid device described herein may be manufactured and assembled using any known techniques in the field.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. An ambulatory aid device comprising:

a user support structure comprising at least one vertical user support structure beam;

an axial structure comprising at least one axial structure beam parallel to the user support structure beam;

a radial arm structure coupling the user support structure to the axial structure, the radial arm structure comprising a pair of parallel arms, including a lower arm and an upper arm, wherein a first end of the lower arm is pivotally coupled to the axial structure via a first lower pivot joint coupled to the axial structure beam and a second end of the lower arm is pivotally coupled to the user support structure via a second lower pivot joint coupled to the axial structure beam, such that the lower arm extends from the axial structure beam to the user support structure beam, wherein a first end of the upper arm is pivotally coupled to the axial structure via a first upper pivot joint coupled to the axial structure beam, and a second end of the upper arm is pivotally coupled to the user support structure via a second upper pivot joint coupled to the axial structure beam, such that the upper arm extends from the axial structure beam to the user support structure beam, wherein the first lower pivot joint is below the first upper pivot joint and the second lower pivot joint being located below the second upper pivot joint, a spring adjustment arm coupled between the axial structure beam and the radial arm structure, wherein a first end of the spring adjustment arm is pivotally coupled to an adjustment arm support element, the adjustment arm support element being coupled to the axial structure between the first lower pivot joint and the first upper pivot joint, wherein the spring adjustment arm is height adjustable with respect to the axial structure, wherein a second end of the spring adjustment arm is pivotally coupled to the radial arm structure, wherein a second end of the spring adjustment arm is coupled to a pivot block, the pivot block being coupled to the upper arm and positioned between a midpoint and the second end of the upper arm, such that the spring adjustment arm extends from the axial structure towards the user support structure, wherein the pair of parallel arms are configured to pivot in parallel and movably hold the user support structure beam in parallel alignment to the axial structure beam, wherein the user support structure is configured to provide gravitational support to a user while walking or standing, wherein the axial structure is held by a fixed support structure and is configured to axially rotate with respect to the fixed support structure, and wherein the user support structure is movable in a generally circular and/or repetitive path about the axial structure.

2. The ambulatory aid device of claim 1, wherein the user support structure is height and/or position adjustable with respect to the fixed support structure.

3. The ambulatory aid device of claim 1, wherein the user support structure comprises user support elements coupled to the user support structure beam of the user support structure, said user support elements comprising a headrest, a trunk support, a pelvic support, a seat, or combinations thereof, said user support elements being position and/or height adjustable with respect to the user support structure beam of the user support structure.

4. The ambulatory aid device of claim 1, wherein user support structure comprises a headrest, a trunk support, a pelvic support, a seat, or combinations thereof.

5. The ambulatory aid device of claim 1, wherein the fixed support structure is configured to anchor the ambulatory aid device.

6. The ambulatory aid device of claim 5, wherein the fixed support structure comprises a fillable or weighted base.

7. The ambulatory aid device of claim 5, wherein the fixed support structure comprises a ceiling bracket with a height adjustable support, wherein the ceiling bracket is configured to contact a ceiling for wedging the ambulatory aid device between the ceiling and ground surface of an indoor structure.

8. The ambulatory aid device of claim 1, wherein the adjustment arm support element is vertically adjustable.

9. The ambulator aid device of claim 8, wherein said adjustment arm support element comprises a shaft, the shaft being adjacent and parallel to the axial structure beam.

10. The ambulatory aid device of claim 9, wherein the shaft is provided within an adjustment shaft tube, wherein the adjustment shaft tube is held parallel to the axial structure beam via a tube support structure coupled to the axial structure beam.

11. The ambulatory aid device of claim 10, wherein the tube support structure comprises a horizontal support block on which the adjustment shaft tube is supported.

12. The ambulatory aid device of claim 1, wherein the spring adjustment arm biases the pair of parallel arms to slope upwards from the axial structure beam to the user support structure beam.

* * * * *